R. H. Hudgin,
Gate.
No. 111,124. Patented Jan. 24, 1871.
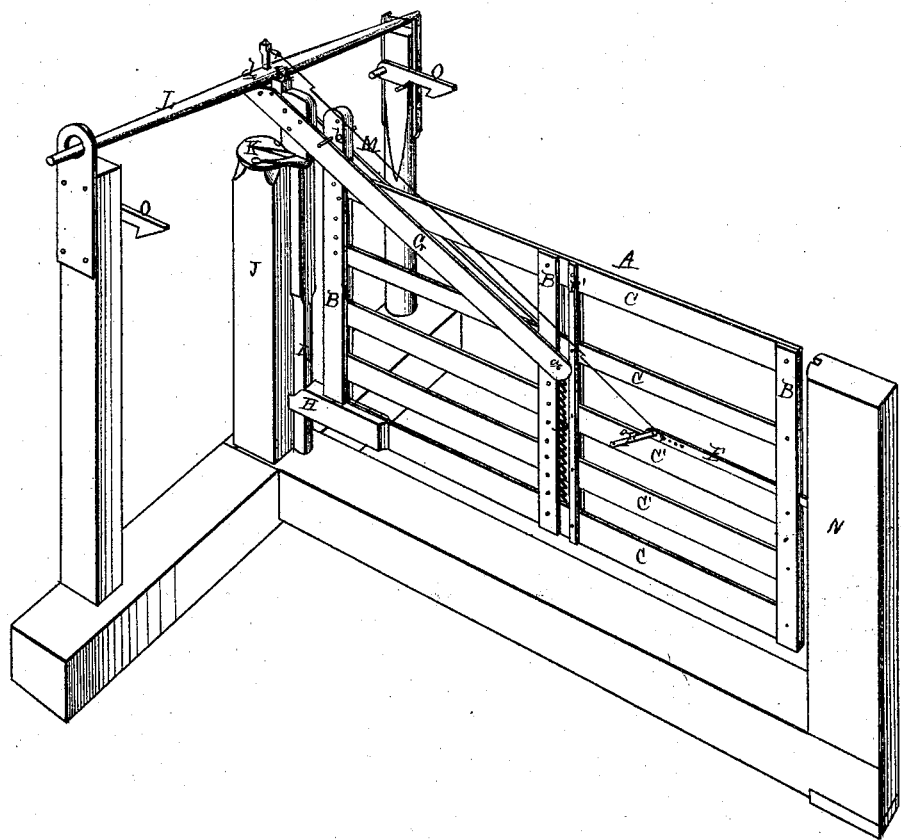
Attest.
M. Stewart
Geo Clark
Inventor.
R. H. Hudgin
per Atty
Thos. S. Sprague

United States Patent Office.

ROBERT HENRY HUDGIN, OF FAIRFIELD, CANADA.

Letters Patent No. 111,124, dated January 24, 1871.

IMPROVEMENT IN GATES.

The Schedule referred to in these Letters Patent and making part of the same.

*To whom it may concern:*

Be it known that I, ROBERT HENRY HUDGIN, of Fairfield, in the county of Kent and Dominion of Canada, have invented a new and useful Improvement in Gates; and I do declare that the following is a true and accurate description thereof, reference being had to the accompanying drawing, and to the letters marked thereon, and being a part of this specification, in which my gate is shown in perspective.

This invention relates to the construction and hanging of a gate, so arranged that it may be readily opened and closed without being obliged to alight from the wagon or horse; that it will close by its own gravity; that its height from the ground may be easily changed, when desired; that will be economical in construction, simple in operation, and not easily deranged.

The invention consisis in a jointed rock-shaft or semi-rotating bar, by means of which the gate may be opened from either side; in the peculiar devices for locking the gate, when closed; and in a new and peculiar arrangement of the various parts to produce a gate which will operate as above set forth, and which is more fully hereinafter described.

In the accompanying drawing—

A represents a gate, constructed of vertical plates, B, and horizontal boards, C, secured together in any convenient manner.

The boards C should extend the whole length of the gate, while those marked C' should be cut off, as shown in the drawing, so that a space may be left between the vertical plates B'.

Within this space is inserted and secured a vertical ratchet D, for the purposes hereinafter described.

E is a latch, by means of which the gate is locked when closed.

It rests upon the top edge of one of the horizontal boards of the fence, as shown, and is connected therewith by means of the radius bars F, one end of which is pivoted to said board, and the other or opposite end to the rear end of the latch.

G are suspension bars or arms, which are connected together by the bolt or pin $a$, which engages with the ratchet D; or the pin may be so arranged as to be easily slipped out of place and pass through a series of holes in place of engaging with the ratchet.

The gate is suspended to these arms upon the pin $a$, and is steadied in its position by the pin $b$ passing through one of a series of holes through the rear vertical plate B of the gate and above the suspension bars, as shown.

The lower end of the gate, and at its rear end, is provided with a fork or muley hinge, H, which engages with the round or polygonal-shaped bar I, which is secured to the front of the gate-post J.

K is a metallic plate, secured to the top of the post J, and protects the same from the action of water and sun.

To this plate, and at a point immediately over the vertical center of the bar I, is pivoted, in any convenient manner, the suspension bars G, so that the same will freely rotate.

L is a rock-shaft or semi-rotating bar, provided with a joint, $d$, at the center of its length, and immediately in line with the plane of the gate when closed.

The center of this bar L rests upon the ends of the suspension arms, while the ends may be supported by any suitable means that will not interfere with its semi-rotation.

A link and pin, $h$, connects the center of this bar with the suspension bars.

M is a connecting-rod, extending from the center of the bar L to the latch E, in such a manner, that, when said bar L is partially rotated, the latch will be withdrawn from its engagement with the post N, and allow the gate to open.

O are suitable hooks or latches, pivoted to any convenient point below the bar L, and they are designed to hold the gate open, when required.

The gate being closed, the operator first gives a partial rotation of the bar L to the rear. This motion detaches the latch E, when, by pulling or pushing the bar L, the gate is thrown open in either desired direction, the link and pin $h$, with that end of the suspension bars which project to the rear and over the post J, forming a compound lever, for the purpose, the fulcrum of which is the point where said suspension bars are pivoted to the plate on top of said post.

After driving through the gate the latch-hook O, which holds it open during the passage, may be disengaged, when the gate will instantly close.

Whenever it is desired to have the gate swing at a greater elevation from the ground the pin $a$ should be engaged with the ratchet D at a lower point, the pin $b$ should be placed in a correspondingly lower hole in the rear vertical plate, and the end of the connecting-rod secured at a corresponding point further from the rear end of the latch.

What I claim as my invention, and desire to secure by Letters Patent, is—

1. The rock-shaft L, provided with a joint, $d$, in connection with the link and pin $h$, and suspension bars G, when constructed, arranged, and operating substantially as and for the purposes set forth.

2. The latch E, secured to the gate by the radius bars F, and operated by the connecting-rod M from the rock-shaft L, substantially as specified.

3. A gate, constructed and operating as herein described, wherein the same is suspended from suspension bars G by the ratchet D, or its equivalent, and steadied by the pin $b$, said suspension bars being pivoted to the top of the post J, substantially as and for the purposes herein set forth.

ROBERT HENRY HUDGIN.

Witnesses:
M. STEWART,
GEO. CLARK.